(12) United States Patent
Ng et al.

(10) Patent No.: US 12,130,876 B2
(45) Date of Patent: Oct. 29, 2024

(54) DYNAMIC USER PROFILE PROJECTION

(71) Applicant: ADOBE INC., San Jose, CA (US)

(72) Inventors: Nathan Ng, Amherst, MA (US); Tung Mai, San Jose, CA (US); Thomas Greger, Lehi, UT (US); Kelly Quinn Nicholes, Lehi, UT (US); Antonio Cuevas, Mountain View, CA (US); Saayan Mitra, San Jose, CA (US); Somdeb Sarkhel, San Jose, CA (US); Anup Bandigadi Rao, San Jose, CA (US); Ryan A. Rossi, San Jose, CA (US); Viswanathan Swaminathan, Saratoga, CA (US); Shivakumar Vaithyanathan, Saratoga, CA (US)

(73) Assignee: ADOBE INC., San Jose, CA (US)

( * ) Notice: Subject to any disclaimer, the term of this patent is extended or adjusted under 35 U.S.C. 154(b) by 30 days.

(21) Appl. No.: 18/049,069

(22) Filed: Oct. 24, 2022

(65) Prior Publication Data
US 2024/0134918 A1 Apr. 25, 2024
US 2024/0232270 A9 Jul. 11, 2024

(51) Int. Cl.
G06F 16/00 (2019.01)
G06F 16/906 (2019.01)
G06F 16/9535 (2019.01)
G06F 16/9538 (2019.01)
H04L 67/306 (2022.01)

(52) U.S. Cl.
CPC ........ *G06F 16/9535* (2019.01); *G06F 16/906* (2019.01); *G06F 16/9538* (2019.01); *H04L 67/306* (2013.01)

(58) Field of Classification Search
None
See application file for complete search history.

(56) References Cited

U.S. PATENT DOCUMENTS

| | | | |
|---|---|---|---|
| 11,288,733 B2* | 3/2022 | Scholl | G06Q 30/0633 |
| 2013/0325780 A1* | 12/2013 | Prakash | G06N 5/02 706/46 |
| 2014/0111629 A1* | 4/2014 | Morris | G06Q 30/0261 348/77 |
| 2014/0297661 A1* | 10/2014 | de Assuncao | G06F 16/24575 707/752 |
| 2017/0134335 A1* | 5/2017 | Goldstein | H04L 51/02 |
| 2017/0286388 A1* | 10/2017 | Tamilarasan | G06F 3/0482 |
| 2019/0205726 A1* | 7/2019 | Khabiri | G06N 3/006 |
| 2019/0361998 A1* | 11/2019 | Meron | G06F 16/285 |
| 2020/0257943 A1* | 8/2020 | Huber | G06F 40/40 |

(Continued)

OTHER PUBLICATIONS

Office Action dated Sep. 5, 2024 in related U.S. Appl. No. 18/049,083.

*Primary Examiner* — Hasanul Mobin
(74) *Attorney, Agent, or Firm* — F. CHAU & ASSOCIATES, LLC

(57) ABSTRACT

Systems and methods for dynamic user profile projection are provided. One or more aspects of the systems and methods includes computing, by a prediction component, a predicted number of lookups for a future time period based on a lookup history of a user profile using a lookup prediction model; comparing, by the prediction component, the predicted number of lookups to a lookup threshold; and transmitting, by a projection component, the user profile to an edge server based on the comparison.

20 Claims, 8 Drawing Sheets

(56) References Cited

U.S. PATENT DOCUMENTS

| | | |
|---|---|---|
| 2021/0056140 A1 | 2/2021 | Zhang et al. |
| 2021/0295224 A1* | 9/2021 | Dorofiyenko ............ G06N 5/04 |
| 2022/0019859 A1* | 1/2022 | Willis ....................... G06F 1/03 |
| 2022/0101355 A1* | 3/2022 | Luo ......................... H04L 51/10 |
| 2022/0222473 A1* | 7/2022 | Nakagawa .............. G06F 16/55 |

* cited by examiner

DYNAMIC USER PROFILE PROJECTION

BACKGROUND

The following relates generally to user profile projection, and more specifically to dynamic user profile projection. User profile projection refers to the transmission of user profiles among one or more devices of a computing system. A user profile can include data that is descriptive of characteristics, devices, and interactions of a user. A typical user profile projection system involves maintaining a collection of user profiles at a central server and projecting a user profile to an edge server in response to a scheduled assignment of the user profile to one or more segments of similar user profiles. In a typical user profile projection system, a third-party user first attempts to lookup a user profile at a geographically proximate edge server. If the edge server does not store the user profile at the time of the request, the edge server requests the user profile from the central server.

However, conventional profile projection systems are inefficient. For example, a central server of a conventional user profile projection system may transmit a user profile to an edge server for a third-party user in response to a segmentation process, regardless of the third-party user's current or future interest in retrieving the transmitted user profile. This is inefficient because it needlessly uses bandwidth of the system and storage space of the edge server to transmit and store an unwanted user profile. There is therefore a need in the art for a dynamic user profile projection system that efficiently allocates user profiles to edge servers.

SUMMARY

An embodiment of the present disclosure provides a dynamic user profile projection system that provides a user profile to an edge server based on a predicted likelihood that the edge server will receive a lookup request for the user profile in the future. In an example, the system retrieves historical lookup data for the user profile and predicts a number of times that the user profile will be looked up in the future based on the historical data. The system then determines that the user profile should be transmitted to an edge server based on the prediction, and transmits the user profile to the edge server based on the determination.

By transmitting the user profile based on a predicted likelihood that the edge server will receive a lookup request for the user profile in the future, the system storing user profiles that are unlikely to be requested at edge servers in the future, which minimizes the bandwidth and storage space used by the system, thereby increasing the operational efficiency of the system.

A method, apparatus, non-transitory computer readable medium, and system for dynamic user profile projection are described. One or more aspects of the method, apparatus, non-transitory computer readable medium, and system include computing a predicted number of lookups for a future time period based on a lookup history of a user profile using a lookup prediction model; comparing the predicted number of lookups to a lookup threshold; and transmitting the user profile to an edge server based on the comparison.

A method, apparatus, non-transitory computer readable medium, and system for dynamic user profile projection are described. One or more aspects of the method, apparatus, non-transitory computer readable medium, and system include receiving a lookup history for a user profile; computing a predicted number of lookups for a future time period based on the lookup history using a lookup prediction model; and transmitting the user profile to an edge server based on the predicted number of lookups.

An apparatus and system for dynamic user profile projection are described. One or more aspects of the apparatus and system include a processor; a memory storing instructions executable by the processor; a lookup component configured to receive a lookup history for a user profile; a prediction component configured to compute a predicted number of lookups for a future time period based on the lookup history using a lookup prediction model; and a projection component configured to transmit the user profile to an edge server based on the predicted number of lookups.

DETAILED DESCRIPTION

Figure 1:
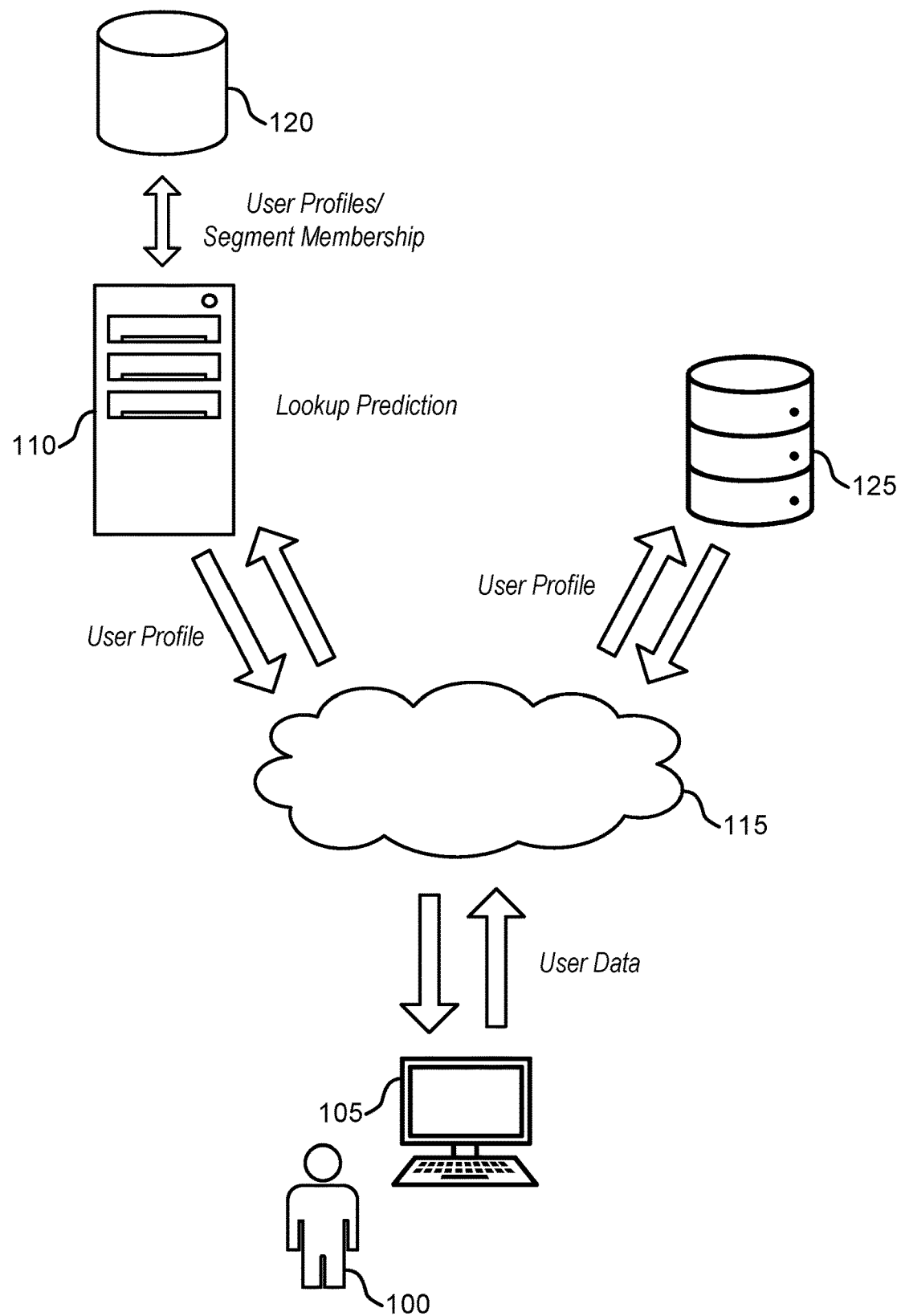
FIG. 1 shows an example of a profile projection system according to aspects of the present disclosure.

Embodiments of the present disclosure relate generally to user profile projection, and more specifically to dynamic user profile projection. User profile projection refers to the transmission of user profiles among one or more devices of a computing system. A user profile can include data that is descriptive of characteristics, devices, and interactions of a user. A typical user profile projection system involves maintaining a collection of user profiles at a central server and projecting a user profile to an edge server in response to a scheduled assignment of the user profile to one or more segments of similar user profiles. In a typical user profile projection system, a third-party user first attempts to lookup a user profile at a geographically proximate edge server. If the edge server does not store the user profile at the time of the request, the edge server requests the user profile from the central server.

However, conventional user profile projection systems are inefficient. For example, a central server of a conventional user profile projection system may transmit a user profile to an edge server for a third-party user in response to a segmentation process, regardless of the third-party user's current or future interest in retrieving the transmitted user profile. This is inefficient because it needlessly uses bandwidth of the system and storage space of the edge server to transmit and store an unwanted user profile. There is therefore a need in the art for a dynamic user profile projection system that efficiently allocates user profiles to edge servers.

According to an embodiment of the present disclosure, a dynamic profile projection system includes a lookup component, a prediction component, and a projection component. In some cases, the lookup component is configured to receive a lookup history for a user profile. In some cases, the prediction component is configured to compute a predicted number of lookups for a future time period based on the lookup history using a lookup prediction model. In some cases, the projection component is configured to transmit the user profile to an edge server based on the predicted number of lookups.

By transmitting the user profile based on a predicted likelihood that the edge server will receive a lookup request for the user profile in the future, the projection component avoids storing user profiles that are unlikely to be requested at edge servers in the future, which minimizes the bandwidth and storage space used by the profile projection system, thereby increasing the operational efficiency of the profile projection system.

In some cases, the prediction component is further configured to compare the predicted number of lookups to a lookup threshold. In some cases, the profile projection system further includes a classification component that is configured to classify the user profile as an active user profile based on the lookup threshold using a dynamic threshold model. In some cases, the projection component is further configured to transmit the user profile to the edge server based on the classification. By comparing the user profile to a lookup threshold that is determined using a dynamic threshold model, the profile projection system is able to further optimize the determination of whether the user profile is likely to be looked up at the edge server in the future, thereby further optimizing the operation efficiency of the dynamic user profile projection system.

As used herein, a "user profile" includes data that is descriptive of characteristics, devices, and interactions of a user. In some cases, a set of user profiles is associated with a third-party user (such as an organization), and a user profile is maintained for each user that has had an interaction with the third-party user.

As used herein, a "lookup history" for a user profile refers to time series data that indicates timestamped historical instances for which the profile projection system has received lookups for the user profile. As used herein, a "lookup" refers to a query for the user profile (such as a request received from a third-party user for the user profile or associated data to be provided to the third-party user).

As used herein, a "predicted number of lookups" refers to a projected number of requests for a user profile. As used herein, an "active user profile" refers to a user profile for which the system has historically received a number of lookups that satisfies a lookup threshold.

As used herein, an "edge server" refers to a server that is proximate to an operational capacity of a third-party user (e.g., a server operated by an organization). In some cases, an edge server receives a lookup for a user profile from a third-party user.

An example use of the profile projection system is in a user profile segmentation context. For example, the system assigns a user profile to a segment of user profiles in response to determining that the user profile satisfies a rule provided by a third-party user for membership in a segment. The system then uses a lookup prediction model to predict a future number of lookups for the user profile based on historical lookup data for the user profile, and based on the predicted number of lookups, the system transmits the user profile to an edge server associated with the segment. The system thereby avoids projecting dormant user profiles to the edge server, which wastes storage and bandwidth.

Figure 4:
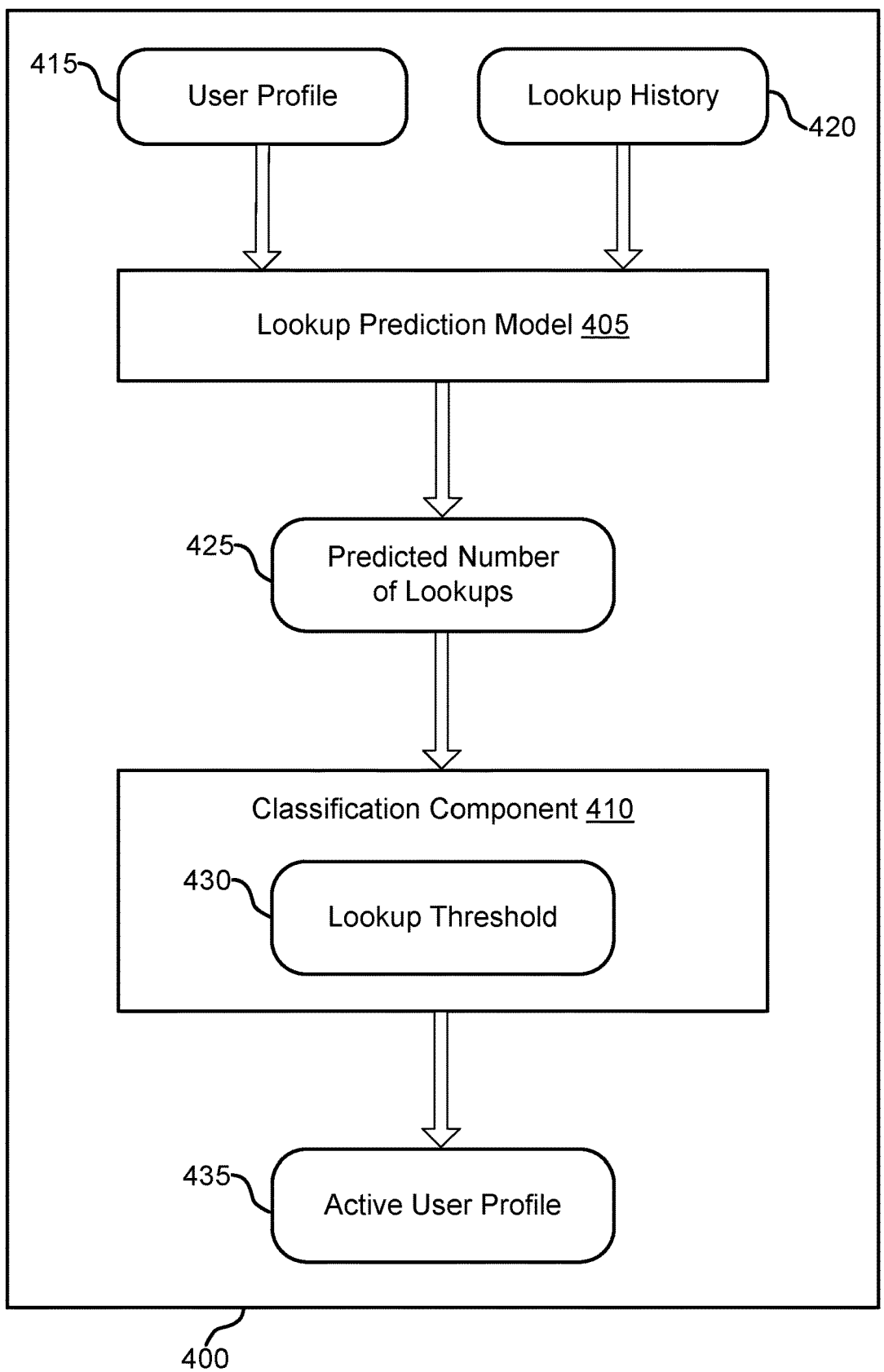
FIG. 4 shows an example of data flow in a profile projection apparatus according to aspects of the present disclosure.
Figure 5:
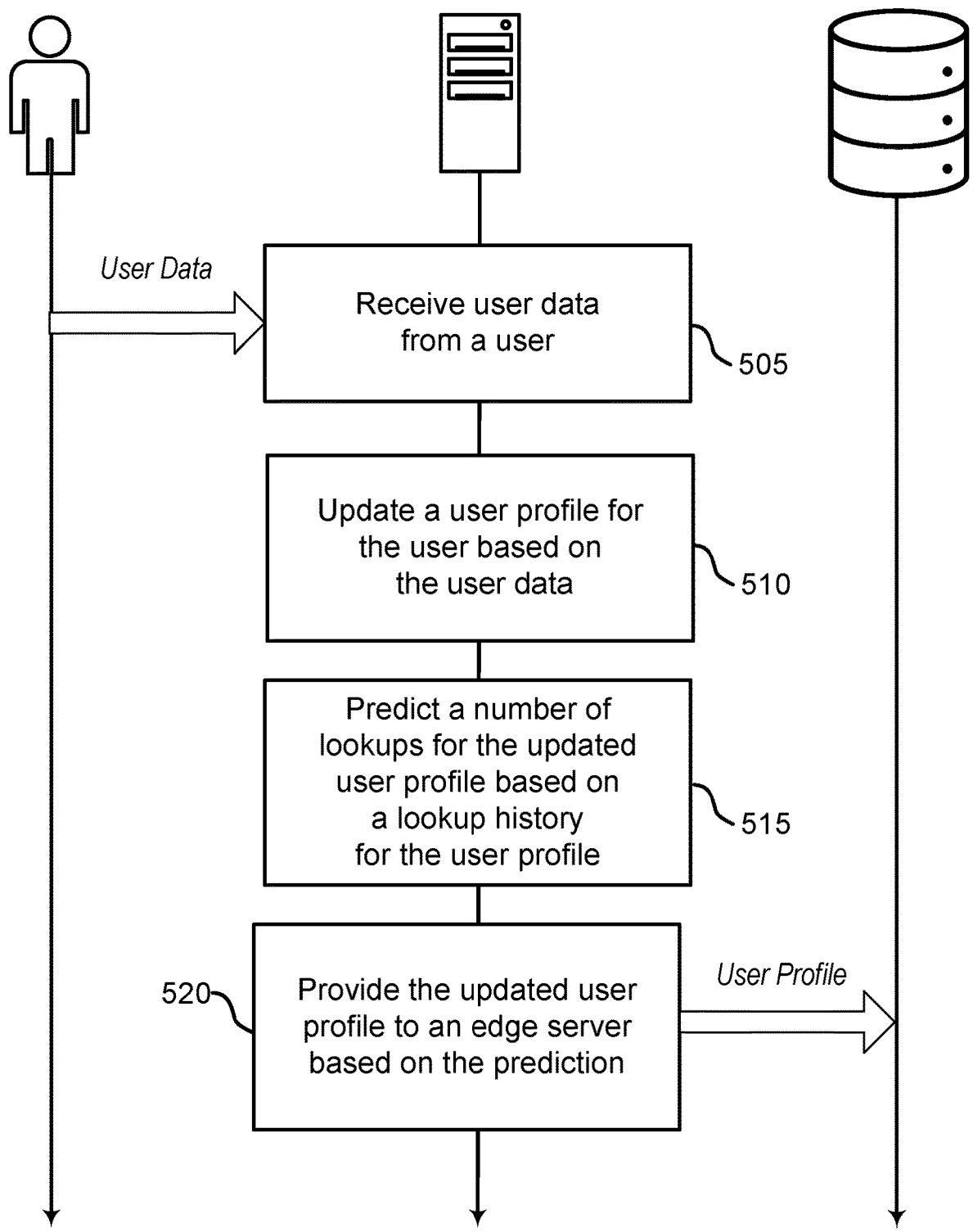
FIG. 5 shows an example of updated profile projection according to aspects of the present disclosure.

Example applications of the present disclosure in the user profile segmentation context are provided with reference to FIGS. 1 and 5. Details regarding the architecture of the system are provided with reference to FIGS. 1-4. Examples of a process for dynamic user profile projection are provided with reference to FIGS. 5-7. Examples of a process for threshold-based user profile projection are provided with reference to FIG. 8.

Profile Projection System

A system and apparatus for dynamic user profile projection is described with reference to FIGS. 1-4. One or more aspects of the system and apparatus include a processor; a memory storing instructions executable by the processor; a lookup component configured to receive a lookup history for a user profile; a prediction component configured to compute a predicted number of lookups for a future time period based on the lookup history using a lookup prediction model; and a projection component configured to transmit the user profile to an edge server based on the predicted number of lookups.

In some cases, the prediction component is further configured to compare the predicted number of lookups to a lookup threshold. Some examples of the system and apparatus further include a classification component configured to classify the user profile as an active user profile based on the lookup threshold.

FIG. 1 shows an example of a profile projection system according to aspects of the present disclosure. The example shown includes user 100, user device 105, profile projection apparatus 110, cloud 115, database 120, and edge server 125.

Referring to FIG. 1, an example of the profile projection system is used in a user segmentation context. For example, user 100 provides data to profile projection apparatus 110 via user device 105 and cloud 115. Profile projection apparatus 110 retrieves a user profile associated with user 100 from database 120, updates the user profile with the user data, and assigns the user profile to a segment of user profiles associated with a third-party user based on data included in the user profile.

In response to assigning the user profile to the segment, profile projection apparatus 110 retrieves a lookup history for the user profile and determines a predicted number of lookups in a future time period for the user profile. Based on the prediction, profile projection apparatus transmits the user profile to edge server 125 for storage. Profile projection apparatus 110 thereby avoids sending a user profile that is unlikely to be looked up in the future to edge server 125, minimizing bandwidth used by profile projection apparatus 110 and storage space used by edge server 125, accordingly increasing the efficiency of the profile projection system.

According to some aspects, user device 105 is a personal computer, laptop computer, mainframe computer, palmtop computer, personal assistant, mobile device, or any other suitable processing apparatus. In some examples, user device 105 includes software that interacts with software or hardware provided or operated by a third-party user, and transmits user data to profile projection apparatus 110.

According to some aspects, a user interface enables user 100 to interact with user device 105. In some embodiments, the user interface may include an audio device, such as an external speaker system, an external display device such as a display screen, or an input device (e.g., a remote control device interfaced with the user interface directly or through an IO controller module). In some cases, the user interface may be a graphical user interface (GUI).

According to some aspects, profile projection apparatus 110 includes a computer implemented network. In some embodiments, profile projection apparatus 110 also includes one or more processors, a memory subsystem, a communication interface, an I/O interface, one or more user interface components, and a bus. Additionally, in some embodiments, profile projection apparatus 110 communicates with user device 105, database 120, edge server 125, or a combination thereof via cloud 115.

In some cases, profile projection apparatus 110 is implemented on a server. A server provides one or more functions to users linked by way of one or more of various networks, such as cloud 115. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general purpose computing device, a personal computer, a laptop computer, a mainframe computer, a supercomputer, or any other suitable processing apparatus.

In some cases, profile projection apparatus 110 is implemented as a hub server. In some cases, a hub server is a centrally located server among one or more edge servers. A server is designated an edge server if it has a direct or close connection to a user, such as a third-party user (e.g., an organization). In some cases, a hub server provides communicates information with the edge server in a manner determined by the hub server (such as in response to a user profile segmentation process, or upon a request for the information from an edge server). As described with reference to FIGS. 5-8, profile projection apparatus 110 provides a user profile to an edge server based on a predicted number of lookups for the user profile.

Figure 2:
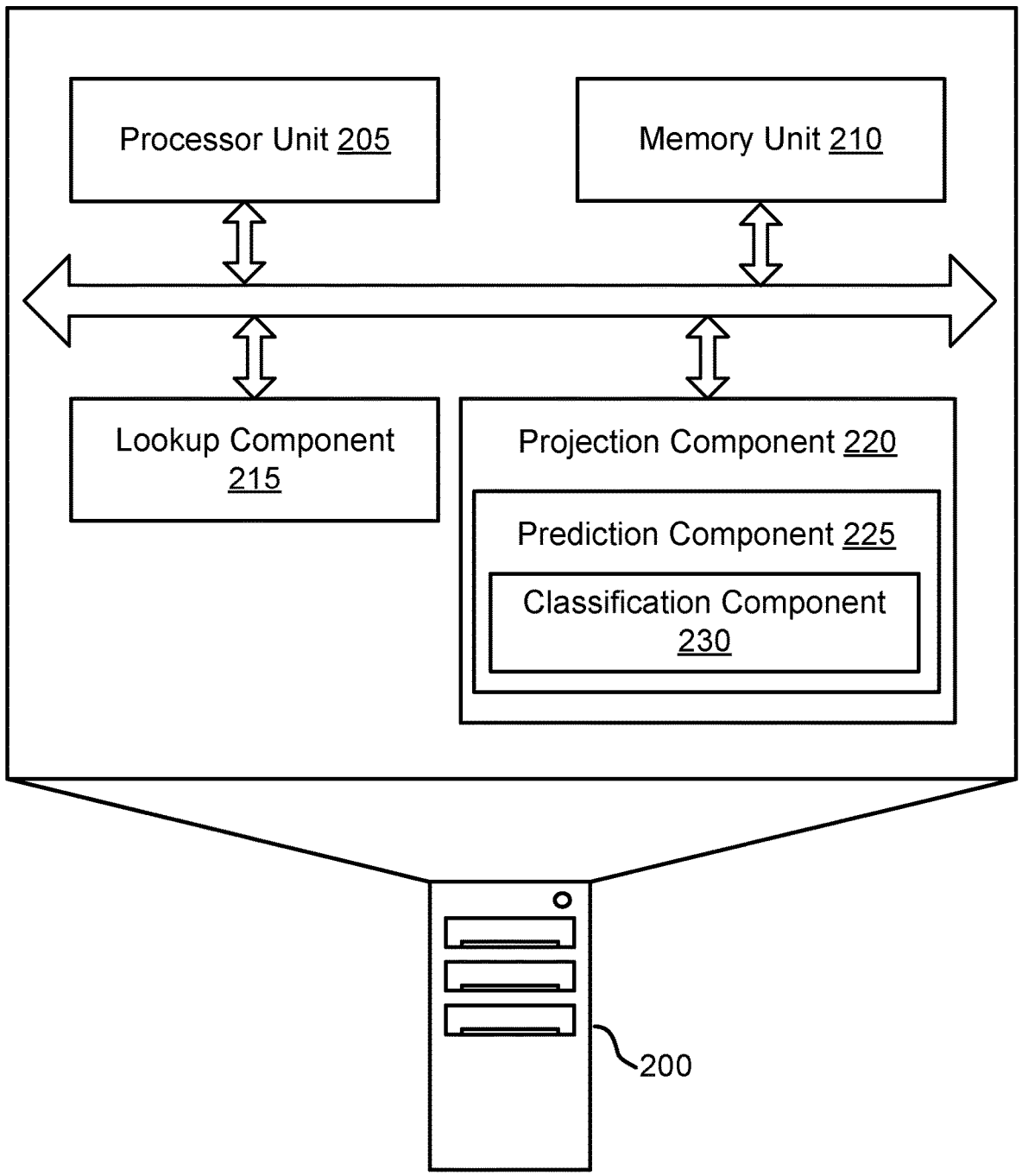
FIG. 2 shows an example of a profile projection apparatus according to aspects of the present disclosure.
Figure 3:
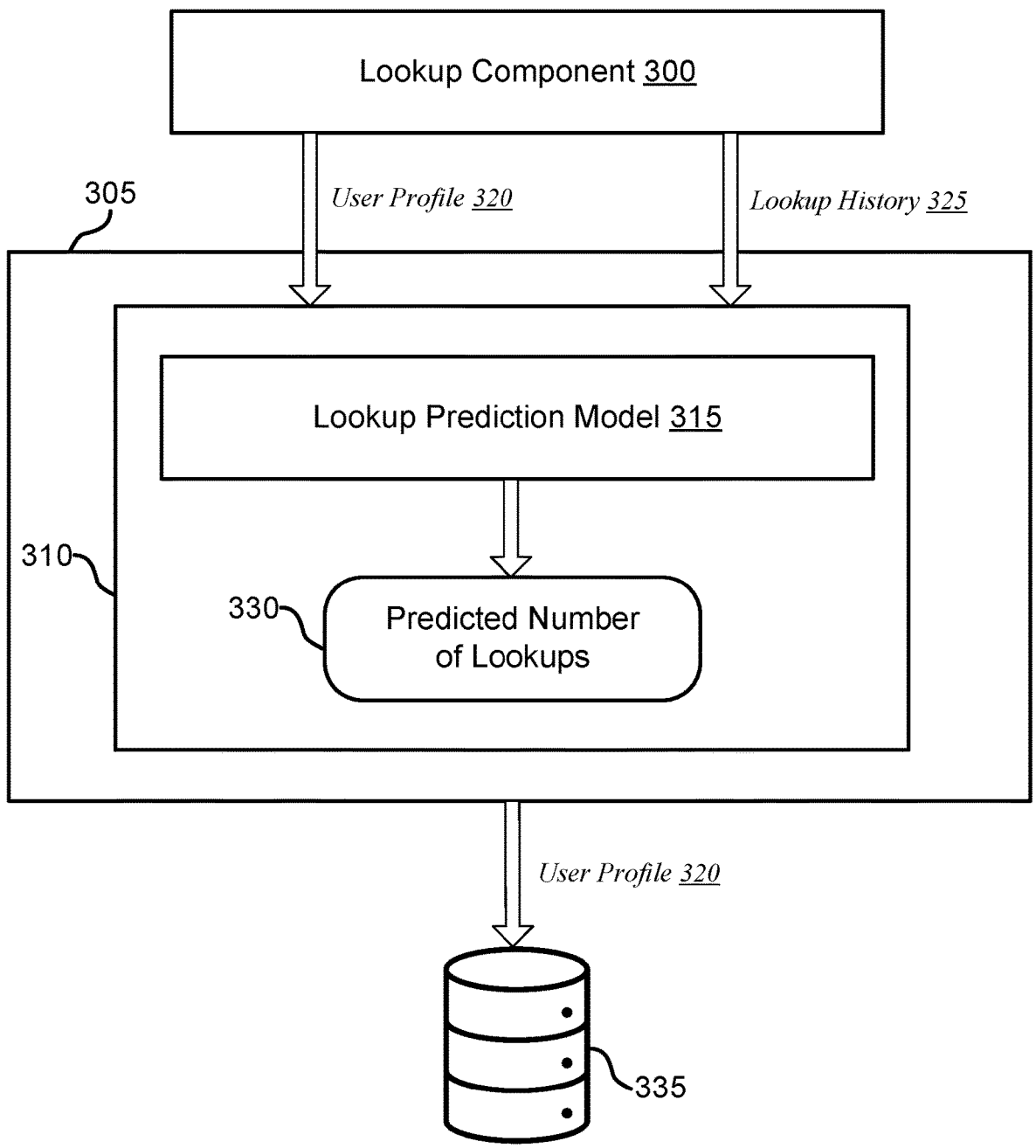
FIG. 3 shows an example of data flow in a profile projection system according to aspects of the present disclosure.

Further detail regarding the architecture of profile projection apparatus 110 is provided with reference to FIGS. 2-4. Further detail regarding a process for dynamic user profile projection is provided with reference to FIGS. 5-7. Further detail regarding a process for threshold-based user profile projection is provided with reference to FIG. 8.

Cloud 115 is a computer network configured to provide on-demand availability of computer system resources, such as data storage and computing power. In some examples, cloud 115 provides resources without active management by user 100. The term "cloud" is sometimes used to describe data centers available to many users over the Internet. Some large cloud networks have functions distributed over multiple locations from central servers (such as hub servers). In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. According to some aspects, cloud 115 provides communications between user device 105, profile projection apparatus 110, database 120, edge server 125, or a combination thereof.

Database 120 is an organized collection of data. In an example, database 120 stores data in a specified format known as a schema. According to some aspects, database 120 is structured as a single database, a distributed database, multiple distributed databases, or an emergency backup database. In some cases, a database controller manages data storage and processing in database 120. In some cases, a user interacts with the database controller. In other cases, the database controller operates automatically without interaction from a user. According to some aspects, database 120 is external to profile projection apparatus 110 and communicates with profile projection apparatus 110 via cloud 115. According to some aspects, database 120 is included in profile projection apparatus 110. According to some aspects, database 120 is a local database for profile projection apparatus 110 (e.g., database 120 stores information stored at profile projection apparatus 110).

According to some aspects, edge server 125 is an edge server for profile projection apparatus 110. According to some aspects, edge server 125 is located in close geographical proximity to operations for a third-party user of the profile projection system. In some cases, edge server 125 includes storage (such as a database similar to database 120) that stores user profiles transmitted (e.g., projected) from profile projection apparatus 110. In some cases, a third-party user provides a user profile lookup request to edge server 125. In some cases, upon determining that edge server 125 does not store the requested user profile, edge server 125 requests that profile projection apparatus 110 provide the requested user profile to edge server 125. In some cases, edge server 125 is included in cloud 115. Edge server 125 is an example of, or includes aspects of, the corresponding element described with reference to FIG. 3.

FIG. 2 shows an example of a profile projection apparatus according to aspects of the present disclosure. Profile projection apparatus 200 is an example of, or includes aspects of, the corresponding element described with reference to FIG. 1. In one aspect, profile projection apparatus 200 includes processor unit 205, memory unit 210, lookup component 215, and projection component 220.

According to some aspects, processor unit 205 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some embodiments, processor unit 205 includes special purpose components for modem processing, baseband processing, digital signal processing, or transmission processing.

According to some aspects, memory unit 210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 205 to perform various functions described herein. In some cases, memory unit 210 includes a basic input/output system (BIOS) that controls basic hardware or software operations, such as an interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, lookup component 215 receives a lookup history for a user profile. In some examples, lookup component 215 retrieves the user profile from a database at a hub server. In some examples, lookup component 215 identifies a segment criterion for a user segment. In some examples, lookup component 215 compares the user profile to the segment criterion. In some examples, lookup component 215 determines that the user profile meets the segment criterion based on the comparison. In some examples, lookup component 215 updates the user profile based on the determination, where the user profile is transmitted to the edge server based on the update.

According to some aspects, lookup component 215 is configured to receive a lookup history for a user profile. According to some aspects, lookup component 215 is implemented as one or more hardware circuits, as firmware, as software stored in memory unit 210 and executable by processor unit 205, or as a combination thereof. Lookup component 215 is an example of, or includes aspects of, the corresponding element described with reference to FIG. 3.

According to some aspects, projection component 220 transmits the user profile to an edge server based on the predicted number of lookups. In some examples, projection component 220 evaluates the user profile based on a projection configuration, where the user profile is transmitted to the edge server based on the configuration. In some examples, projection component 220 stores the user profile on the edge server. According to some aspects, projection component 220 transmits the user profile to an edge server based on the comparison.

According to some aspects, projection component 220 is configured to transmit the user profile to an edge server based on the predicted number of lookups. According to some aspects, projection component 220 is implemented as one or more hardware circuits, as firmware, as software stored in memory unit 210 and executable by processor unit 205, or as a combination thereof. Projection component 220 is an example of, or includes aspects of, the corresponding element described with reference to FIG. 3.

In one aspect, projection component 220 includes prediction component 225. According to some aspects, prediction component 225 computes a predicted number of lookups for a future time period based on the lookup history using a lookup prediction model. According to some aspects, prediction component 225 compares the predicted number of lookups to a lookup threshold.

In some examples, prediction component 225 identifies a target user interaction. In some examples, prediction component 225 identifies time series data for the target user interaction, where the predicted number of lookups is based on the time series data. In some examples, prediction component 225 identifies a duration between an initial lookup for the user profile and a latest lookup for the user profile, where the predicted value is based on the duration. In some examples, prediction component 225 identifies a duration between an initial lookup for the user profile and an end of a current time period, where the predicted value is based on the duration. In some aspects, the lookup prediction model includes a beta geometric negative binomial distribution (BG-NBD) model.

According to some aspects, prediction component 225 is configured to compute a predicted number of lookups for a future time period based on the lookup history using a lookup prediction model. According to some aspects, prediction component 225 is implemented as one or more hardware circuits, as firmware, as software stored in memory unit 210 and executable by processor unit 205, or as a combination thereof. Prediction component 225 is an example of, or includes aspects of, the corresponding element described with reference to FIGS. 3 and 4.

In one aspect, prediction component 225 includes classification component 230. According to some aspects, classification component 230 classifies the user profile as an active user profile based on the lookup threshold, where the user profile is transmitted to the edge server based on the classification. In some examples, classification component 230 determines the lookup threshold using a dynamic threshold model. In some aspects, the dynamic threshold model includes a seasonal autoregressive moving average (ARIMA) model.

According to some aspects, classification component 230 is configured to compare the predicted number of lookups to a lookup threshold and to classify the user profile as an active user profile based on the lookup threshold. According to some aspects, classification component 230 is implemented as one or more hardware circuits, as firmware, as software stored in memory unit 210 and executable by processor unit 205, or as a combination thereof. Classification component 230 is an example of, or includes aspects of, the corresponding element described with reference to FIG. 4.

FIG. 3 shows an example of data flow in a profile projection system according to aspects of the present disclosure. The example shown includes lookup component 300, projection component 305, prediction component 310, lookup prediction model 315, user profile 320, lookup history 325, predicted number of lookups 330, and edge server 335.

Lookup component 300 and projection component 305 are examples of, or include aspects of, the corresponding elements described with reference to FIG. 2. Prediction component 310 is an example of, or includes aspects of, the corresponding element described with reference to FIGS. 2 and 4. Lookup prediction model 315 is an example of, or includes aspects of, the corresponding element described with reference to FIG. 4.

User profile 320, lookup history 325, and predicted number of lookups 330 are examples of, or include aspects of, the corresponding elements described with reference to FIG. 4. Edge server 335 is an example of, or includes aspects of, the corresponding element described with reference to FIG. 1.

In the example of FIG. 3, lookup component 300 retrieves user profile 320 and lookup history 325 for user profile 320 from a database (such as the database or the edge server as described with reference to FIG. 1). Lookup component 300 provides user profile 320 and lookup history 325 to prediction component 310 of projection component 305.

Prediction component 310 provides user profile 320 and lookup history 325 as input to lookup prediction model 315, and lookup prediction model outputs predicted number of lookups 325 for user profile 320 in response to the input. Based on predicted number of lookups 325, projection component 305 transmits user profile 320 to edge server 335.

FIG. 4 shows an example of data flow in a profile projection apparatus according to aspects of the present disclosure. The example shown includes prediction component 400, lookup prediction model 405, classification component 410, user profile 415, lookup history 420, predicted number of lookups 425, lookup threshold 430, and active user profile 435.

Prediction component 400 is an example of, or includes aspects of, the corresponding element described with reference to FIGS. 2 and 3. Lookup prediction model 405 is an example of, or includes aspects of, the corresponding element described with reference to FIG. 3. Classification component 410 is an example of, or includes aspects of, the corresponding element described with reference to FIG. 2.

User profile 415, lookup history 420, and predicted number of lookups 425 are examples of, or include aspects of, the corresponding elements described with reference to FIG. 3.

In the example of FIG. 4, prediction model 400 provides user profile 415 and lookup history 420 for user profile 415 as inputs to lookup prediction model 405, and lookup prediction model 405 outputs predicted number of lookups 425 in response to the inputs.

Prediction model 400 provides predicted number of lookups 425 to classification component 410, and classification component compares predicted number of lookups 425 to lookup threshold 430 to determine that user profile 415 is active, thereby determining active user profile 435.

Dynamic User Profile Projection Based on Lookup Prediction

A method for dynamic user profile projection is described with reference to FIGS. 5-7. One or more aspects of the method include receiving a lookup history for a user profile; computing a predicted number of lookups for a future time period based on the lookup history using a lookup prediction model; and transmitting the user profile to an edge server based on the predicted number of lookups.

Some examples of the method further include comparing the predicted number of lookups to a lookup threshold. Some examples further include classifying the user profile as an active user profile based on the lookup threshold, wherein the user profile is transmitted to the edge server based on the classification. Some examples of the method further include determining the lookup threshold using a dynamic threshold model. In some aspects, the dynamic threshold model comprises a seasonal autoregressive moving average (ARIMA) model.

Some examples of the method further include retrieving the user profile from a database at a hub server. Some examples further include identifying a segment criterion for a user segment. Some examples further include comparing the user profile to the segment criterion. Some examples further include determining that the user profile meets the segment criterion based on the comparison. Some examples further include updating the user profile based on the determination, wherein the user profile is transmitted to the edge server based on the update.

Some examples of the method further include evaluating the user profile based on a projection configuration, wherein the user profile is transmitted to the edge server based on the configuration. Some examples of the method further include storing the user profile on the edge server.

Some examples of the method further include identifying a target user interaction. Some examples further include identifying time series data for the target user interaction, wherein the predicted number of lookups is based on the time series data. Some examples of the method further include identifying a duration between an initial lookup for the user profile and an end of a current time period, wherein the predicted number of lookups is based on the duration. In some aspects, the lookup prediction model comprises a beta geometric negative binomial distribution (BG-NBD) model.

FIG. 5 shows an example of updated profile projection according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, an example of the system is used in a segmentation context. For example, in conventional user segmentation systems, a user profile is assigned to a segment of user profiles when the user profile satisfies some rule for segment membership, and the user profile is transmitted to an edge server in response to being assigned to the segment. However, this conventional process is indiscriminate with respect to user profile lookup activity. For example, a conventional user segmentation system may not have received a lookup request for a user profile from a third-party user in a number of previous time periods, which would tend to indicate that the user profile is dormant and is not of interest to the third-party user. The conventional user segmentation system is unable to recognize that the user profile is dormant, and if a dormant user profile satisfies the segmentation rule, the dormant user profile will still be transmitted to the edge server, thereby wasting storage space and bandwidth.

Accordingly, a system according to an embodiment of the present disclosure uses a lookup prediction model to predict a future number of lookups for a user profile based on historical user data, and transmits the user profile to the edge server based on the predicted number of lookups. The system thereby avoids projecting dormant user profiles to the edge server, which wastes storage and bandwidth.

At operation 505, the system receives user data from a user. In some cases, the operations of this step refer to, or may be performed by, a profile projection apparatus as described with reference to FIG. 1. In an example, the user data relates to a user interaction (such as a visit to a website, a visit to physical location, a purchase, etc.).

At operation 510, the system updates a user profile for the user based on the user data. In some cases, the operations of this step refer to, or may be performed by, a profile projection apparatus as described with reference to FIG. 1. In an example, the user profile is updated to include the information included in the user data. In an example, the profile projection apparatus assigns the user profile corresponding to the user to a segment of user profiles based on data included in the user profile. In an example, the profile projection apparatus updates the user profile to indicate the assignment of the user profile to the segment. In some cases, the user profile is assigned to a segment of user profiles as described with reference to FIGS. 6 and 7.

At operation 515, the system predicts a number of lookups for the updated user profile based on lookup history for the user profile. In some cases, the operations of this step refer to, or may be performed by, a profile projection apparatus as described with reference to FIG. 1. In some cases, the profile projection apparatus predicts the number of lookups for the user profile as described with reference to FIG. 6.

At operation 520, the system provides the updated user profile to an edge server based on the prediction. In some cases, the operations of this step refer to, or may be performed by, a profile projection apparatus as described with reference to FIG. 1. In some cases, the profile projection apparatus provides the user profile to the edge server based on the prediction as described with reference to FIG. 6.

Figure 6:
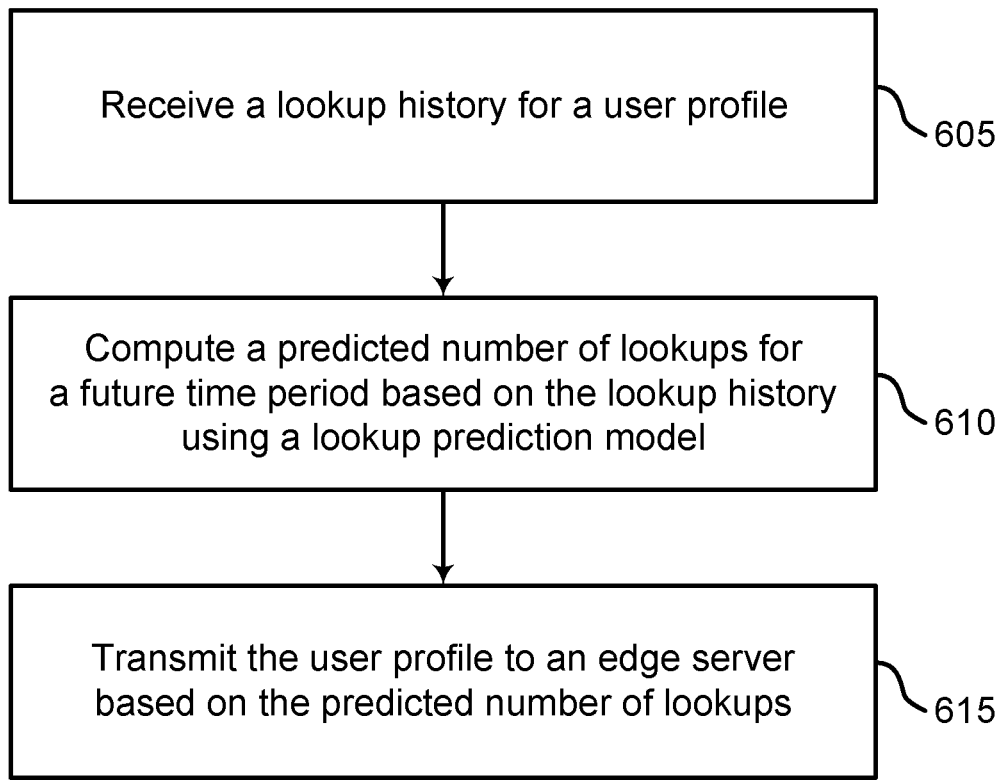
FIG. 6 shows an example of dynamic user profile projection according to aspects of the present disclosure.

FIG. 6 shows an example of dynamic user profile projection according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, the system determines whether a user profile should be projected to an edge server based on a lookup history for the user profile. For example, according to various times and numbers of times that the system has received a lookup request for the user profile in previous time periods, the system predicts, using a lookup prediction model, a number of times that the system will receive a lookup request for the user profile in a future time period. By projecting the user profile to the edge server based on the predicted number of lookups, the system helps the edge server to avoid storing a user profile that will probably not be looked up in a future time period and is therefore redundant. By avoiding projecting redundant user profiles to the edge server, the system improves the functioning of the system by minimizing a use of bandwidth by the system and a use of storage at the edge server.

At operation 605, the system receives a lookup history for a user profile. In some cases, the operations of this step refer to, or may be performed by, a lookup component as described with reference to FIGS. 2 and 3.

According to some aspects, the lookup component identifies a user profile as a candidate for being projected to an edge server. In some cases, the lookup component identifies the user profile as a candidate for projection in response to a user profile segmentation process described with reference to FIG. 7. In some cases, in response to identifying the user profile as a candidate for projection, the lookup component retrieves the lookup history for the user profile from a database (such as the database as described with reference to FIG. 1, or the edge server as described with reference to FIG. 1).

At operation 610, the system computes a predicted number of lookups for a future time period based on the lookup history using a lookup prediction model. In some cases, the operations of this step refer to, or may be performed by, a prediction component as described with reference to FIGS. 2-4.

According to some aspects, the prediction component receives the user profile and the lookup history for the user profile from the lookup component and provides the user profile and the lookup history to the lookup prediction model. The lookup prediction model takes the user profile and the lookup history as input and outputs a predicted number of lookups for a future time period for the user profile. In some cases, the future time period includes a beginning time, an ending time, and a duration, and the future time period is provided to the lookup prediction model as a parameter.

According to some aspects, the lookup prediction model comprises a beta geometric negative binomial distribution (BG-NBD) model. In some cases, a BG-NBD model models a probability distribution of a discrete random variable that is equal to a number of failures needed to get a number of successes in a sequence of independent Bernoulli trials. The probability of success of each trial stays constant within any given experiment but varies across different experiments following a beta distribution. Accordingly, the distribution is a compound probability distribution. In some cases, the BG-NBD model receives the user profile and the lookup history for the user profile as input and outputs the predicted number of lookups for a future time period for the user profile according to a prediction made by the BG-NBD model based on the input.

According to some aspects, the prediction component identifies a target user interaction in the user profile. An example of a target user interactions includes a visit to a website, an addition or removal of a product to or from a digital shopping cart, a purchase of an item, a return of an item, a visit to a store or other physical location, etc. According to some aspects, the prediction component identifies time series data for the target user interaction. For example, in some cases, the time series data includes a number of time periods during which the user associated with the user profile engaged in the target user interaction. In some cases, the time series data is included in the user profile. According to some aspects, the prediction component predicts the predicted number of lookups using the time series data as an input.

According to some aspects, the prediction component identifies in the lookup history a duration between an initial lookup for the user profile and a latest lookup for the user profile, and the prediction component predicts the predicted number of lookups based on the duration.

According to some aspects, the prediction component identifies in the lookup history a duration between an initial lookup for the user profile and an ending time of a current time period, and the prediction component predicts the predicted number of lookups based on the duration.

At operation 615, the system transmits the user profile to an edge server based on the predicted number of lookups. In some cases, the operations of this step refer to, or may be performed by, a projection component as described with reference to FIGS. 2 and 3.

According to some aspects, the prediction component compares the predicted number of lookups to a lookup threshold. If the predicted number of lookups exceeds the predicted number of lookups, a classification component of the projection component classifies the user profile as an active user profile. In some cases, the projection component evaluates the user profile against a projection configuration, where the user profile is transmitted (e.g., projected) to the edge server based on the configuration. For example, in some cases, if the user profile is in a desired user profile segment, is an active user profile, satisfies some other projection criterion, or a combination thereof, the projection component transmits the user profile to the edge server. According to some aspects, the projection component instructs the edge server to store the user profile on the edge server.

In some cases, the lookup threshold is provided by a third-party user. In some cases, the third-party user that provides the lookup threshold is the third-party user that provides the segment criterion for the user profile as described with reference to FIG. 7. In some cases, the edge server is associated with a user segment associated with the third-party user.

In some cases, the classification component determines the lookup threshold using a dynamic lookup threshold model. In some cases, the classification component provides the lookup history for the user profile as input to the dynamic lookup threshold model. In some cases, the classification component provides a lookup history for each user profile in a user profile segment as input to the dynamic lookup threshold model. In some cases, the classification component provides a lookup history for each user profile that corresponds to an interaction with a third-party user as input to the dynamic lookup threshold model. Based on the input, the dynamic lookup threshold model outputs a lookup threshold that is optimized for a future time period based on historical activity indicated by the input to the model. For example, the lookup threshold is optimized to allow a maximum amount of user profiles to be classified as active while minimizing an amount of user profiles that are incorrectly classified as active.

In an example, a set of lookup histories indicates that a number of lookups for the set of user profiles varies according to given past time periods. The dynamic lookup threshold model optimizes a lookup threshold for one or more future time periods based on the set of lookup histories so that an optimal number of user profiles will be transmitted to the edge server during a given future time period, thereby adjusting dynamically adjusting user profile projection according to a predicted workload of the edge server and avoiding under- or over-projection of user profiles.

According to some aspects, the dynamic lookup threshold model comprises any appropriate statistical model that is capable of capturing time-period variations in historical data and predicting an outcome based on the historical data. An example of such a model is a seasonal autoregressive moving average seasonal (ARIMA) model. An autoregressive ARIMA model is a generalization of an autoregressive moving average (ARMA) model. In an ARIMA model, an evolving variable of interest is regressed on its own lagged (i.e., prior) values, while a regression error of the model is a linear combination of error terms whose values occur contemporaneously and at various times in the past, and data values are replaced with a difference between the data values and previous values to make the model fit the data as well as possible. Unlike an ARIMA model, a seasonal ARIMA model supports data with a seasonal component (such as variation in data corresponding to different time periods), and is therefore able to capture time-period fluctuations in lookup numbers for user profiles and make a prediction based in part on the fluctuations.

Figure 7:
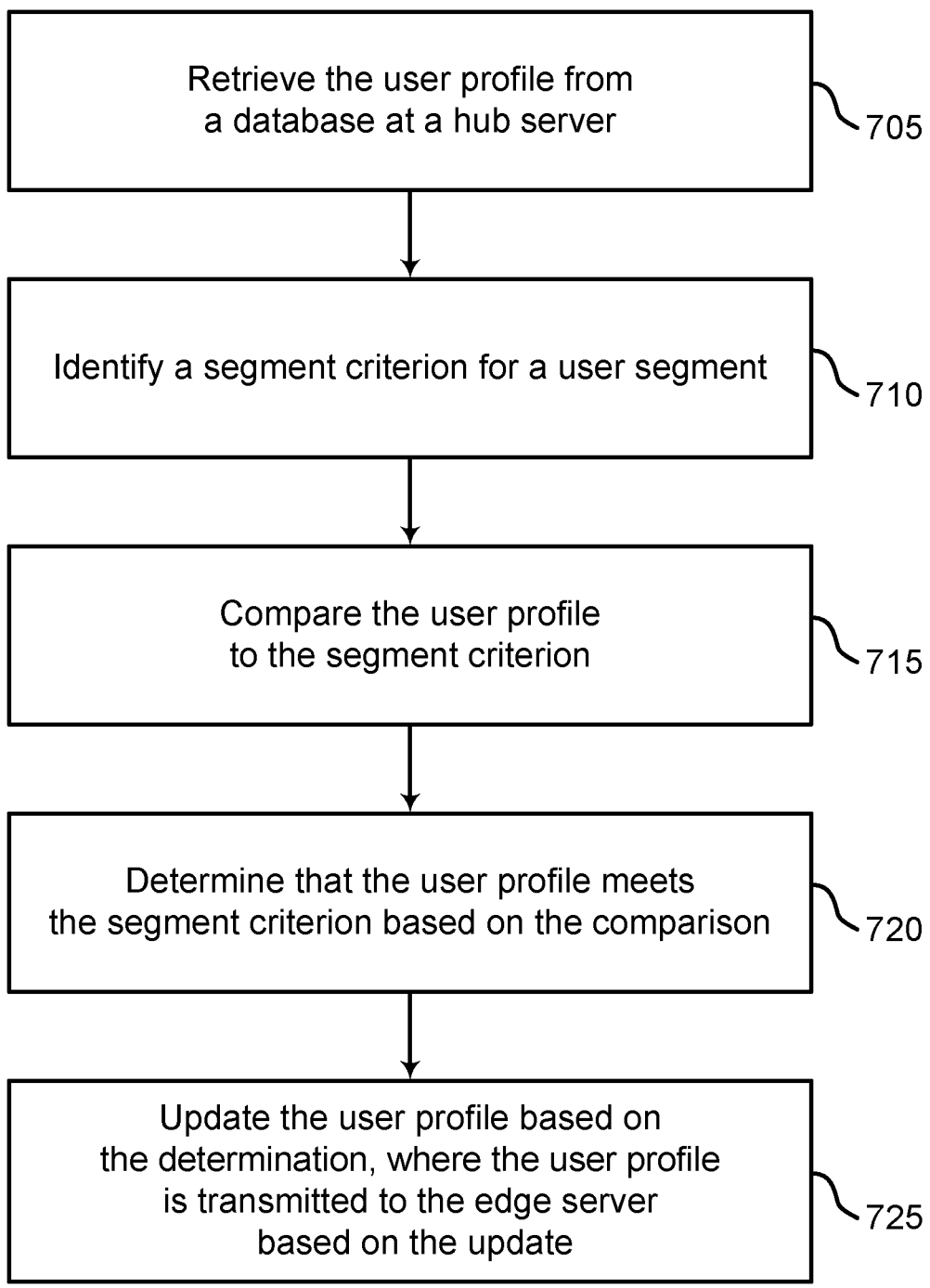
FIG. 7 shows an example of user profile segmentation according to aspects of the present disclosure.

FIG. 7 shows an example of user profile segmentation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 7, the system performs a user profile segmentation process (such as a batch segmentation process) to update and segment user profiles. For example, in a batch segmentation process, one or more user profiles stored in the database at the hub server may be retrieved at a particular time interval (such as daily) and updated with newly received user profile data to evaluate the user profile against a segment criterion. In some cases, an assignment of a user profile to a segment identifies the user profile as a candidate for projection to a corresponding edge server.

In some cases, a segment criterion is provided by a third-party user to the system. In some cases, the segment criterion is a rule that is used to indicate whether a user profile that includes data that meets or satisfies the rule is to be assigned to a corresponding segment of user profiles. An example segment criterion is "A user visited a particular website operated by a particular third-party user". If a user profile includes data that indicates that the user has visited the particular website, the segment criterion is satisfied and the user is assigned to a segment of user profiles that corresponds to the satisfaction of the segment criterion.

At operation 705, the system retrieves the user profile from a database at a hub server. In some cases, the operations of this step refer to, or may be performed by, a lookup component as described with reference to FIGS. 2 and 3. For example, in some cases, the database at the hub server is the database as described with reference to FIG. 1. In some cases, the lookup component retrieves the user profile in response to an instruction to perform a segmentation process.

At operation 710, the system identifies a segment criterion for a user segment. In some cases, the operations of this step refer to, or may be performed by, a lookup component as described with reference to FIGS. 2 and 3.

At operation 715, the system compares the user profile to the segment criterion. In some cases, the operations of this step refer to, or may be performed by, a lookup component as described with reference to FIGS. 2 and 3.

At operation 720, the system determines that the user profile meets the segment criterion based on the comparison. In some cases, the operations of this step refer to, or may be performed by, a lookup component as described with reference to FIGS. 2 and 3.

At operation 725, the system updates the user profile based on the determination, where the user profile is transmitted to the edge server based on the update. In some cases, the operations of this step refer to, or may be performed by, a lookup component as described with reference to FIGS. 2 and 3. For example, in some cases, the user profile is updated with information indicating that the user profile is assigned to a segment of user profiles corresponding to a satisfaction of a segment criterion. In some cases, in response to the update, the lookup component identifies the user profile as a candidate for projection to an edge server corresponding to the segment, and the lookup component proceeds to determine a predicted number of lookups for the user profile as described with reference to FIG. 6.

Threshold-Based Dynamic User Profile Projection

A method for dynamic user profile projection is described with reference to FIG. 8. One or more aspects of the method include computing a predicted number of lookups for a future time period based on a lookup history of a user profile using a lookup prediction model; comparing the predicted number of lookups to a lookup threshold; and transmitting the user profile to an edge server based on the comparison.

Some examples of the method further include classifying the user profile as an active user profile based on the lookup threshold, wherein the user profile is transmitted to the edge server based on the classification. Some examples of the method further include determining the lookup threshold using a dynamic threshold model. In some aspects, the dynamic threshold model comprises a seasonal autoregressive moving average (ARIMA) model.

Some examples of the method further include identifying a target user interaction. Some examples further include identifying time series data for the target user interaction, wherein the predicted number of lookups is based on the time series data. Some examples of the method further include identifying a duration between an initial lookup for the user profile and a latest lookup for the user profile, wherein the predicted number of lookups is based on the duration. In some aspects, the lookup prediction model comprises a beta geometric negative binomial distribution (BG-NBD) model.

Figure 8:
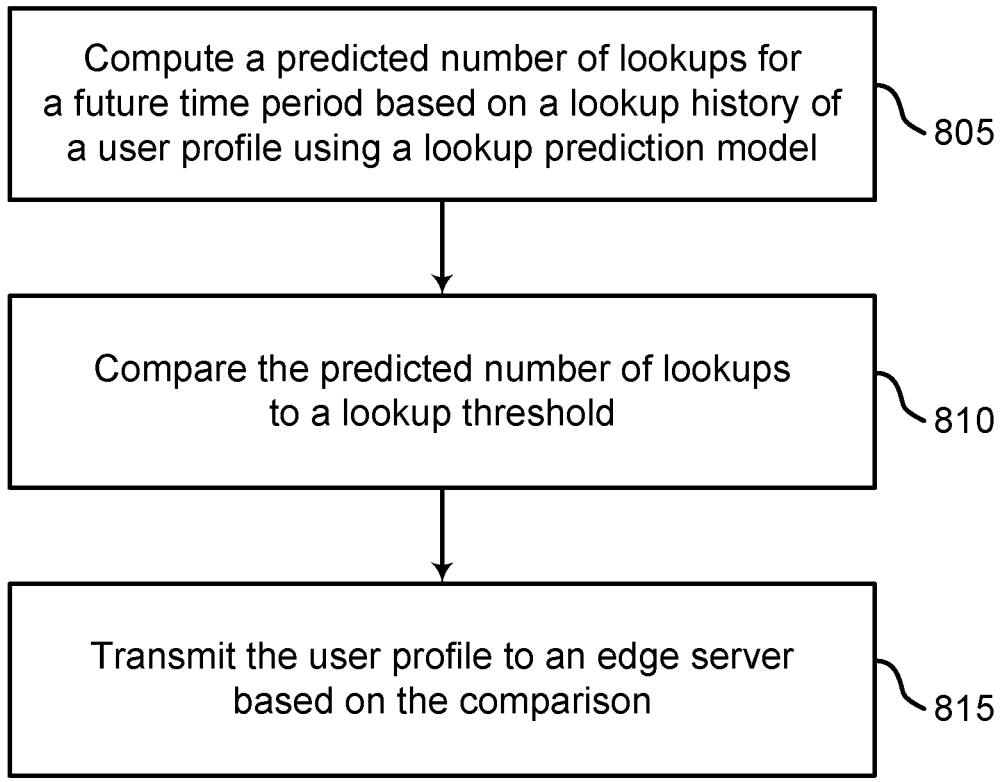
FIG. 8 shows an example of threshold-based user profile projection according to aspects of the present disclosure.

FIG. 8 shows an example of threshold-based user profile projection according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system computes a predicted number of lookups for a future time period based on a lookup history of a user profile using a lookup prediction model. In some cases, the operations of this step refer to, or may be performed by, a prediction component as described with reference to FIGS. 2-4.

In some cases, a prediction component identifies a target user interaction and identifies time series data for the target user interaction, where the predicted number of lookups is based on the time series data. In some cases, the prediction component identifies a duration between an initial lookup for the user profile and a latest lookup for the user profile, where the predicted value is based on the duration. In some cases, the lookup prediction model comprises a beta geometric negative binomial distribution (BG-NBD) model.

At operation 810, the system compares the predicted number of lookups to a lookup threshold. In some cases, the operations of this step refer to, or may be performed by, a prediction component as described with reference to FIG. 5. In some cases, a classification component classifies the user profile as an active user profile based on the lookup threshold, where the user profile is transmitted to the edge server based on the classification. In some cases, the classification component determines the lookup threshold using a dynamic threshold model. In some cases, the dynamic threshold model comprises a seasonal autoregressive moving average (ARIMA) model.

At operation 815, the system transmits the user profile to an edge server based on the comparison. In some cases, the operations of this step refer to, or may be performed by, a projection component as described with reference to FIGS. 2 and 3.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for dynamic user profile projection, comprising:
   computing, by a prediction component, a predicted number of lookups for a future time period based on a lookup history of a user profile using a lookup prediction model;
   comparing, by the prediction component, the predicted number of lookups to a lookup threshold, wherein the lookup threshold corresponds to a number of lookups; and transmitting, by a projection component, the user profile to an edge server based on the comparison.

2. The method of claim 1, further comprising:
classifying, by a classification component, the user profile as an active user profile based on the lookup threshold, wherein the user profile is transmitted to the edge server based on the classification.

3. The method of claim 1, further comprising:
determining, by the classification component, the lookup threshold using a dynamic threshold model.

4. The method of claim 3, wherein:
the dynamic threshold model comprises a seasonal autoregressive moving average (ARIMA) model.

5. The method of claim 1, further comprising:
identifying, by the prediction component, a target user interaction; and
identifying, by the prediction component, time series data for the target user interaction, wherein the predicted number of lookups is based on the time series data.

6. The method of claim 1, further comprising:
identifying, by the prediction component, a duration between an initial lookup for the user profile and a latest lookup for the user profile, wherein the predicted number of lookups is based on the duration.

7. The method of claim 1, wherein:
the lookup prediction model comprises a beta geometric negative binomial distribution (BG-NBD) model.

8. A method for dynamic user profile projection, comprising:
receiving, by a lookup component, a lookup history for a user profile;
computing, by a prediction component, a predicted number of lookups for a future time period based on the lookup history using a lookup prediction model; and
transmitting, by a projection component, the user profile to an edge server based on the predicted number of lookups.

9. The method of claim 8, further comprising:
comparing, by the prediction component, the predicted number of lookups to a lookup threshold; and
classifying, by a classification component, the user profile as an active user profile based on the lookup threshold, wherein the user profile is transmitted to the edge server based on the classification.

10. The method of claim 9, further comprising:
determining, by the classification component, the lookup threshold using a dynamic threshold model.

11. The method of claim 10, wherein:
the dynamic threshold model comprises a seasonal autoregressive moving average (ARIMA) model.

12. The method of claim 8, further comprising:
retrieving, by the lookup component, the user profile from a database at a hub server;
identifying, by the lookup component, a segment criterion for a user segment;
comparing, by the lookup component, the user profile to the segment criterion;
determining, by the lookup component, that the user profile meets the segment criterion based on the comparison; and
updating, by the lookup component, the user profile based on the determination, wherein the user profile is transmitted to the edge server based on the update.

13. The method of claim 8, further comprising:
evaluating, by the projection component, the user profile based on a projection configuration, wherein the user profile is transmitted to the edge server based on the configuration.

14. The method of claim 8, further comprising:
storing, by the projection component, the user profile on the edge server.

15. The method of claim 8, further comprising:
identifying, by the prediction component, a target user interaction; and
identifying, by the prediction component, time series data for the target user interaction, wherein the predicted number of lookups is based on the time series data.

16. The method of claim 8, further comprising:
identifying, by the prediction component, a duration between an initial lookup for the user profile and a latest lookup for the user profile, wherein the predicted number of lookups is based on the duration.

17. The method of claim 8, further comprising:
identifying, by the prediction component, a duration between an initial lookup for the user profile and an end of a current time period, wherein the predicted number of lookups is based on the duration.

18. The method of claim 8, wherein:
the lookup prediction model comprises a beta geometric negative binomial distribution (BG-NBD) model.

19. An apparatus for dynamic user profile projection, comprising:
a processor;
a memory storing instructions executable by the processor;
a lookup component configured to receive a lookup history for a user profile;
a prediction component configured to compute a predicted number of lookups for a future time period based on the lookup history using a lookup prediction model; and
a projection component configured to transmit the user profile to an edge server based on the predicted number of lookups.

20. The apparatus of claim 19, wherein:
the prediction component is further configured to compare the predicted number of lookups to a lookup threshold; and
the apparatus further comprises a classification component configured to classify the user profile as an active user profile based on the lookup threshold.

* * * * *